(12) United States Patent
Wisilosky et al.

(10) Patent No.: US 7,917,532 B1
(45) Date of Patent: Mar. 29, 2011

(54) SYSTEM FOR TRACKING DATA SHARED WITH EXTERNAL ENTITIES

(75) Inventors: Ignatious Stanley Wisilosky, San Antonio, TX (US); Greg Alan Harpel, San Antonio, TX (US); Joseph Paul Griffin, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1026 days.

(21) Appl. No.: 11/322,493

(22) Filed: Dec. 30, 2005

(51) Int. Cl.
*G06F 7/00* (2006.01)

(52) U.S. Cl. ............... 707/783; 726/28; 726/29; 726/30

(58) Field of Classification Search .................. 707/1, 3, 707/9, 694, 783, 784, 785, 786, 787; 726/27, 726/28, 29, 30
See application file for complete search history.

(56) References Cited

U.S. PATENT DOCUMENTS

| | | | |
|---|---|---|---|
| 7,549,162 B2 * | 6/2009 | Aaron | 726/12 |
| 2004/0028266 A1 | 2/2004 | Jones et al. | |
| 2004/0088295 A1 * | 5/2004 | Glazer et al. | 707/9 |
| 2004/0158544 A1 | 8/2004 | Taekman et al. | |
| 2005/0038993 A1 * | 2/2005 | Zivic et al. | 713/164 |
| 2005/0177559 A1 | 8/2005 | Nemoto | |
| 2005/0273842 A1 | 12/2005 | Wright et al. | |
| 2006/0020814 A1 * | 1/2006 | Lieblich et al. | 713/182 |
| 2006/0047605 A1 | 3/2006 | Ahmad | |
| 2006/0059544 A1 | 3/2006 | Guthrie et al. | |
| 2006/0059560 A1 | 3/2006 | Montulli | |
| 2006/0212713 A1 | 9/2006 | Hatakeda | |
| 2006/0229996 A1 * | 10/2006 | Keithley et al. | 705/75 |
| 2006/0248592 A1 | 11/2006 | Agrawal et al. | |
| 2007/0067853 A1 | 3/2007 | Ramsey | |
| 2007/0130070 A1 * | 6/2007 | Williams | 705/50 |

OTHER PUBLICATIONS http://www.epic.org/privacy/glba/ (Nov. 10, 2005) "The Gramm-Leach-Bliley Act".
http://www.iso.ch/iso/en/CatalogueDetailPage . . . (Nov. 9, 2005) "ISO/IEC 17799:2005".
Kiefer, Kimberly et al. (2004), Chapter 5 "Information Security Best Practices," *Information Security: A Legal, Business, and Technical Handbook*, American Bar Association (ABA), pp. 45-49.
Kiefer, Kimberly et al. (2004), Appendix A: "Standards, Guidelines, Best Practices, and Other Resources," *Information Security: A Legal, Business, and Technical Handbook*, ABA, pp. 65-68.
Kiefer, Kimberly et al. (2004), Appendix B: "Examples of Information Security Best Practices," *Information Security: A Legal, Business, and Technical Handbook*, ABA, pp. 69-82.

* cited by examiner

*Primary Examiner* — Khanh B Pham
*Assistant Examiner* — Amy Ng
(74) *Attorney, Agent, or Firm* — Brooks, Cameron & Huebsch, PLLC

(57) ABSTRACT

System and method for keeping inventories of sensitive data that has been shared with external entities. The system and method may be used particularly for identifying a source of an unauthorized release of sensitive data.

20 Claims, 14 Drawing Sheets

ONLINE DATA INVENTORY FORM – START     400

404 — *Information Release Detail*
- Information Release #: _____ ☐ Deactivate this Release
- Creation Date: _____
- Last Certified Date: _____

*Primary Point of Contact*

408
- Employee ID#: _____
- Name: _____
- Job Title: _____
- Phone: _____
- Department: _____
- CoSA: _____

*Alternate Point of Contact*

412
- Employee ID#: _____
- Name: _____
- Job Title: _____
- Phone: _____
- Department: _____
- CoSA: _____

*Third Party Receiving Data*

416
- Third Party Name: _____
- Street of PO Box: _____
- City: _____
- -or- APO/FPO: _____
- State/U.S. Territory: _____    Only needed for U.S., Australia, Mexico and Canada
- -or- Province/State: _____
- Zip/Postal Code: _____
- Country: _____
- Point of Contact: _____
- Job Title: _____
- Phone: _____

| v Continue | X Cancel |

FIG. 4A

ONLINE DATA INVENTORY FORM – CONTINUED  400

*Shared Data and Method of Sharing*

Member Data Types:
- ☑ Address
- ☐ Bank Account #
- ☑ Bank Transit Routing #
- ☑ Birthdate
- ☑ Branch of Service
- ☐ Cause of Death
- ☑ Commission/Enlistm't Date
- ☐ Credit/Debit Cd #
- ☐ Credit/Debit Cd Exp'n Date
- ☐ Credit/Debit Cd Security #
- ☐ Credit Score
- ☐ Digitized Signature
- ☐ Driver's License #
- ☐ E-mail Address
- ☐ Gov't Issued ID #
- Other _____

- ☐ Medical Information
- ☐ Member #
- ☐ Military Status
- ☐ Military Rank
- ☐ Mother's Maiden Name
- ☑ Name
- ☐ Other Account #
- ☐ Password
- ☐ Personal ID # (PIN)
- ☐ Phone – Home
- ☐ Phone – Other
- ☐ Salary/Income
- ☐ SSN
- ☐ Tax ID #
- ☐ Vehicle ID # (VIN)

420

Employee Data Types:
- ☐ Address
- ☐ Birthdate
- ☐ Digitized Signature
- ☑ E-mail Address
- ☐ Medical Information
- ☐ Mother's Maiden Name
- Other _____

- ☐ Name
- ☐ Password
- ☐ Personal ID # (PIN)
- ☐ Salary
- ☐ SSN

Sharing Direction: ? Send  ? Receive  ? Both

Sharing Method:
- ☑ B2B Exchange
- ☑ B2B Copper
- ☑ CD/DVD/Optical
- ☑ Diskette
- ☑ E-mail
- Other _____

- ☑ FTP
- ☑ Harbinger
- ☑ Tape
- ☑ Paper
- ☐ Website

| v Continue | X Cancel |

FIG. 4B

ONLINE DATA INVENTORY FORM – CONTINUED  400

*Shared Data and Method of Sharing (continued)*

424
- Physical Media Shared by:
  - ☐ Delivery Service (FedEx, UPS, etc)
  - ☐ Hand Carried
  - ☐ Postal
- One-time Share: ? Yes ? No
- Frequency:
  - ☐ Daily        ☐ Semi-Annually
  - ☐ Monthly      ☐ Annually
  - ☐ Quarterly    Other _____
- First Date for Sharing Data: _____ MM/DD/YYYY
- List Those w/ Data Access: _____
- Data Destroyed / Returned: ? Yes ? No
- Data Shared w/ oth'r 3rd Pty: ? Yes ? No

*Security*

428
- Data Sensitivity Score:
  - ☐ S1 = Unrestricted
  - ☐ S2 = Internal Use Only
  - ☐ S3 = Confidential
  - ☐ S4 = Restricted
- Att'y-Client Privileged: ? Yes ? No  [Yes = S5]
- Purpose for Sharing Data: _____
- Security Controls:
  - ☐ Enhanced Security on Transmission
  - ☐ On-Site Security Evaluation
  - ☐ Contractual Controls
  - Other _____
- Contract: ? Yes ? No
- Contract Control # (CCN): _____
- Sharing Terms in Contract: ? Yes ? No

[ v Continue ] [ X Cancel ]

FIG. 4C

ONLINE DATA INVENTORY FORM – CONTINUED

400

Company Attorney Information

442
- ID#: _____
- Name: _____
- Job Title: _____
- Phone: _____
- Department: _____
- Sharing Info-Legal Exmpt'n: _____  INTERNAL CODE

| v Continue | X Cancel |

FIG. 4D

PRELIMINARY DATA INVENTORY FORM　　　　　500

Point of Contact Information (on company employee primarily responsible for release of data to external entity)

504
- Department Name: _____
- Point of Contact Name: _____
- Title: _____
- Phone: _____
- Current Date: _____

Information on External Entity Receiving Company Data

508
- Name: _____
- Street: _____
- City: _____
- State: _____
- Country: _____
- Zip: _____
- Point of Contact: _____
- Phone Number: _____
- Purpose for receiving data: _____

Data Classification and Handling

512
- List data being shared (member name, address, SSN, credit card number, etc.): _____
- Media on which data is shared (tape, paper, CD, diskette, e-mail, etc.): _____
- Method for sending data (courier, postal, e-mail, FTP, etc.): _____
- One time event (Y/N)?: _____
- If No, what is the frequency of sharing (daily, monthly, etc.)?: _____
- Date(s) data sent: _____
- Who is in the receiving entity will have access to company's data?: _____

- Is there a contract in place with the receiving entity (Y/N)? _____
- If Yes, does the contract contain data sharing provisions? _____
- Will the data be released by the receiving entity to another external entity (Y/N)? _____
- If Yes, name of other external entity receiving data: _____

FIG. 5

CODED FIELDS UNDER CODED RECORDS – START

600

604 — TRANSFERRED_DATA
- [key] DATA_TYPE_SURROGATE_KEY: int IDENTITY
- DATA_TRANSFER_SURROGATE_KEY: int NOT NULL (FK)(IE1.1)
- DATA_SHARE_CATEGORY_DESC: varchar(20) NOT NULL
- DATA_SENSITIVITY_DESC: varchar(40) NOT NULL
- DATA_SHARE_TYPE_DESC: varchar(60) NOT NULL (IE2.1)
- START_DT: datetime NOT NULL
- END_DT: datetime NULL

608 — LU_VALUES
- [key] ATTRIBUTE_SURROGATE_KEY: int NOT NULL
- ATTRIBUTE_NM: varchar(30) NOT NULL
- ATTRIBUTE_NM2: varchar(20) NULL
- ATTRIBUTE_VALUE_DESC: varchar(60) NOT NULL
- ATTRIBUTE_AVAILABLE_CD: char(1) NOT NULL

612 — COMPANY_EMPLOYEE_HISTORY
- DATA_TRANSFER_SURROGATE_KEY: int NOT NULL (FK) (IE2.1)
- EMPLOYEE_ID_NR: char(5) NOT NULL (IE1.1)
- EMPLOYEE_ROLE_DESC: varchar(30) NOT NULL
- RECORD_CREATED_DT: datetime NOT NULL
- START_DT: datetime NOT NULL
- END_DT: datetime NOT NULL

616 — TRANSFER_EVENT_CONTRACT_RLSHIP
- [key] DATA_TRANSFER_SURROGATE_KEY: int NOT NULL (FK)
- [key] DATA_SHARING_CONTRACT_SURG_KEY: INTEGER NOT NULL (FK)

620 — TRANSFER_MEDIA
- DATA_TRANSFER_SURROGATE_KEY: int NOT NULL (FK) (IE2.1)
- MEDIA_TYPE_DESC: varchar(20) NOT NULL (IE1.1)

FIG. 6B

CODED FIELDS UNDER CODED RECORDS – CONTINUED

600

624

| DATA_TRANSFER_EVENT |
|---|
| [key] DATA_TRANSFER_SURROGATE_KEY: int IDENTITY |
| DATA_DIRECTION_CD: char(1) NULL |
| FIRST_DATA_SHARE_DT: datetime NULL (IE4.1) |
| EXPECTED_DESTROYED_TS: datetime NULL |
| DATA_DESTROYED_DT_TM: datetime NULL |
| EXPECTED_RETURN_TS: datetime NULL |
| DATA_RETURNED_DT_TM: datetime NULL |
| ONE_TIME_EVENT_IND: char(1) NOT NULL |
| DATA_SHARE_LAST_OCCURRENCE_TS: datetime NULL |
| DATA_SHARING_END_TS: datetime NULL |
| CERTIFICATION_NEEDED_DT_TM: datetime NULL |
| EXT_ORG_SHARES_W_THRD_PRTY_IND: char(1) NOT NULL |
| DATA_DESTROYED_OR_RETURNED_IND: char(1) NULL |
| CONTRACT_IN_PLACE_IND: char(1) NULL |
| DATA_SHARE_LAST_REVIEW_TS: datetime NULL |
| COMPANY_ATTORNEY_EMPLOYEE_ID_NR: char(5) NULL (IE3.1) |
| POC_EMPLOYEE_ID_NR: char(5) NOT NULL (IE1.1) |
| SECONDARY_POC_EMPLOYEE_ID_NR: char(5) NULL (IE2.1) |
| SUBMITTER_EMPLOYEE_ID_NR: char(5) NULL |
| LEGAL_REVIEW_EMPLOYEE_ID_NR: char(5) NULL |
| ATTORNEY_CLIENT_PRIVILEGE_IND: char(1) NULL |
| CERTIFICATION_NEEDED_IND: char(1) NULL |
| DEACTIVATED_RELEASE_IND: char(1) NULL |
| EXCHANGE_NAME_TXT: varchar(40) NULL (IE5.1) |
| EVENT_FREQUENCY_DESC: varchar(20) NOT NULL |
| PURPOSE_FOR_SHARING_DATA_TXT: varchar(50) NOT NULL |
| EXPECTED_DATA_DESTROY_DT_TXT: varchar(255) NULL |
| LEGAL_EXEMPTION_TXT: varchar(255) NULL |
| COMPANY_DATA_OWNER_NM: varchar(40) NULL |
| START_DT: datetime NOT NULL |
| END_DT: datetime NULL |
| EVENT_FREQUENCY_DESC: varchar(20) NOT NULL |
| PURPOSE_FOR_SHARING_DATA_TXT: varchar(50) NOT NULL |
| EXPECTED_DATA_DESTROY_DT_TXT: varchar(255) NULL |

FIG. 6C

CODED FIELDS UNDER CODED RECORDS – CONTINUED     600

628 — TRANSFER_METHOD
- DATA_TRANSFER_SURROGATE_KEY: int NOT NULL (FK) (IE2.1)
- HANDLING_METHOD_DESC: varchar(60) NOT NULL (IE1.1)

632 — TRANSFER_EVENT_EXTERNAL_ORG_RLSHIP
- [key] DATA_TRANSFER_SURROGATE_KEY: int NOT NULL (FK)
- [key] ORGANIZATION_SURG_KEY: int NOT NULL (FK)

636 — EXTERNAL_ORGANIZATION
- [key] ORGANIZATION_SURG_KEY: int IDENTITY (IE1.2)
- EXTERNAL_ORGANIZATION_NM: varchar(5) NOT NULL (IE1.1)
- STREET_ADDRESS: varchar(30) NULL
- CITY_NAME: varchar(25) NULL
- STATE_CD: varchar(5) NULL
- ZIP_CD: varchar(11) NULL
- COUNTRY_NAME_DESC: varchar(30) NULL
- PROVINCE_CD: char(3) NULL
- FOREIGN_LOCATION_IND: char(1) NULL
- DATA_ACCESSIBLE_TO_TXT: varchar(255) NULL
- START_DT: datetime NOT NULL
- END_DT: datetime NULL

640 — CONTRACT
- [key] DATA_SHARING_CONTRACT_SURG_KEY: INTEGER IDENTITY (IE1.2)
- ORGANIZATION_SURG_KEY: INTEGER NOT NULL (FK) (AK1.1)
- DATA_SHARING_CONTRACT_NR: varchar(20) NOT NULL (AK1.2)
- DATA_SHARING_CNTRC_PRVSN_TXT: varchar(250) NULL
- DATA_SHARING_CONTRACT_TS: datetime NOT NULL (AK1.3)
- START_DT: datetime NOT NULL
- END_DT: datetime NULL

644 — SECURITY_CONTROL
- DATA_TRANSFER_SURROGATE_KEY: int NOT NULL (FK) (IE1.1)
- SECURITY_CONTROLS_DESC: varchar(35) NOT NULL (IE2.1)

FIG. 6D

CODED FIELDS UNDER CODED RECORDS – CONTINUED

648 —
EXTERNAL_ORGANIZATION_EMPLOYEE
[key] EMPLOYEE_SURG_KEY: INTEGER IDENTITY
ORGANIZATION_SURG_KEY: INTEGER NOT NULL (FK)
EMPLOYEE_FULL_NM: varchar(50) NOT NULL (IE1.1)
EXTERNAL_COMPANY_POC_IND: char(1) NOT NULL
POC_EMPLOYEE_JOB_TITLE_NM: varchar(30) NOT NULL
START_DT: datetime NOT NULL
END_DT: datetime NULL 652 —
EXTERNAL_ORGANIZATION_TELEPHONE
[key] ORG_TELEPHONE_SURG_KEY: INTEGER IDENTITY
ORGANIZATION_SURG_KEY: INTEGER NOT NULL (FK)
TELEPHONE_NR: varchar(23) NULL (AK1.1)
TELEPHONE_EXTENSION_NR: varchar(5) NULL (AK1.2)
TELEPHONE_USAGE_DESC: varchar(15) NULL (AK1.3)
FOREIGN_PHONE_IND: char(1) NULL
START_DT: datetime NOT NULL
END_DT: datetime NULL

FIG. 6E

SYSTEM FOR TRACKING DATA SHARED WITH EXTERNAL ENTITIES

CROSS-REFERENCE TO RELATED APPLICATIONS

This application is related to the following co-pending applications, which are each hereby incorporated by reference in their entirety: U.S. patent application Ser. No. 11/323,208, entitled SYSTEM FOR TRACKING DATA SHARED WITH EXTERNAL ENTITIES, by Ignatious S. Wisilosky et al., filed Dec. 30, 2005, and U.S. patent application Ser. No. 11/322,497, entitled SYSTEM FOR TRACKING DATA SHARED WITH EXTERNAL ENTITIES, by Ignatious S. Wisilosky et al., also filed Dec. 30, 2005.

TECHNICAL FIELD

The disclosed embodiments relate generally to data security and, more particularly, to a system and method for keeping inventories of sensitive data that have been shared with external entities, as well as for identifying a source of an unauthorized release of that data.

BACKGROUND

Corporate entities of all sizes and industry sectors generally have a keen interest in protecting internal or proprietary data against unauthorized release. A breach in data security may result in the loss of critical market advantages for an organization or company, as well as lead to the violation of privacy rights and interests of employees, customers, clients, partners, members or other stakeholders.

Data security is also of keen interest to both government and private standard-setting bodies. The U.S. government, for example, has enacted several statutes that address, at least in part, data security for corporate entities. These include the Gramm-Leach-Bliley Act of 1999 (GLBA) and the Sarbanes-Oxley Act of 2002 (SOXA).

GLBA, which is also known as the Financial Services Modernization Act of 1999, requires banks, brokerage companies, and insurance companies to: 1) store personal financial information securely, 2) advise customers, clients or members of company policies on sharing of personal financial information, and 3) provide consumers the option to opt out of some sharing of personal financial information.

SOXA mandates that all public organizations demonstrate due diligence in the disclosure of financial information, and it requires that public organizations implement a series of internal controls and procedures to communicate, store and protect financial data. Public organizations are also required under SOXA to protect these controls from threats (internal and external) and unauthorized access, including those that could occur through online systems and networks. This level of security is necessary to ensure that organizations or companies maintain data integrity for employees, customers, clients, partners, members and other stakeholders.

Among private standard-setting bodies, the International Organization for Standardization (ISO) and the International Electrotechnical Commission (IEC) have promulgated the ISO/IEC 17799:2005 standard. The ISO/IEC 17799:2005 standard establishes guidelines and general principles for initiating, implementing, maintaining and improving information security management in an organization.

The objectives outlined in the ISO/IEC 17799:2005 standard provide general guidance on the commonly accepted goals of information security management. The standard contains best practices of control objectives and controls in several areas of information security management, including: security policy; organization of information security; asset management; human resources security; physical and environmental security; communications and operations management; access control; information systems acquisition, development and maintenance; information security incident management; business continuity management; and compliance.

Laws and standards on data security motivate human vigilance in this area. Though laws and standards on data security may accordingly reduce unauthorized releases of data intended by companies to remain internal or proprietary, they do not eliminate these releases. Innovations to help identify the source of an unauthorized release would help company managers both to assess the severity of an unauthorized release and to implement procedures to prevent or minimize future unauthorized releases. Various embodiments are particularly useful in helping to identify the source of an unauthorized release of sensitive data.

SUMMARY

Some embodiments relate to a computer system for a holder of sensitive data to identify an external entity as a candidate for being a source for an unauthorized release of sensitive data previously shared by the holder with the external entity, wherein the computer system is programmed to perform acts comprising accepting entry of characteristics of sensitive data that was released without authorization, searching a tracking system database for characteristics of the previously shared sensitive data that was released without authorization, and identifying as a candidate source for the unauthorized release of sensitive data an external entity revealed by the tracking system database as having received the previously shared sensitive data.

BRIEF DESCRIPTION OF THE DRAWINGS

A more complete appreciation of the disclosed embodiments and their attendant advantages will be readily obtained and better understood by reference to the following detailed description when considered in conjunction with the accompanying drawings (it being understood that the drawings contained herein are not necessarily drawn to scale); wherein:

FIGS. 4A-4D illustrate an exemplary online data inventory form that may be used with a tracking system according to some embodiments;

FIG. 5 illustrates an exemplary off-line data inventory form that may be used with a tracking system according to some embodiments; and FIGS. 6A-6E illustrate relationships between exemplary database tables and the database fields in each database table according to some embodiments.

DETAILED DESCRIPTION

Figure 1:
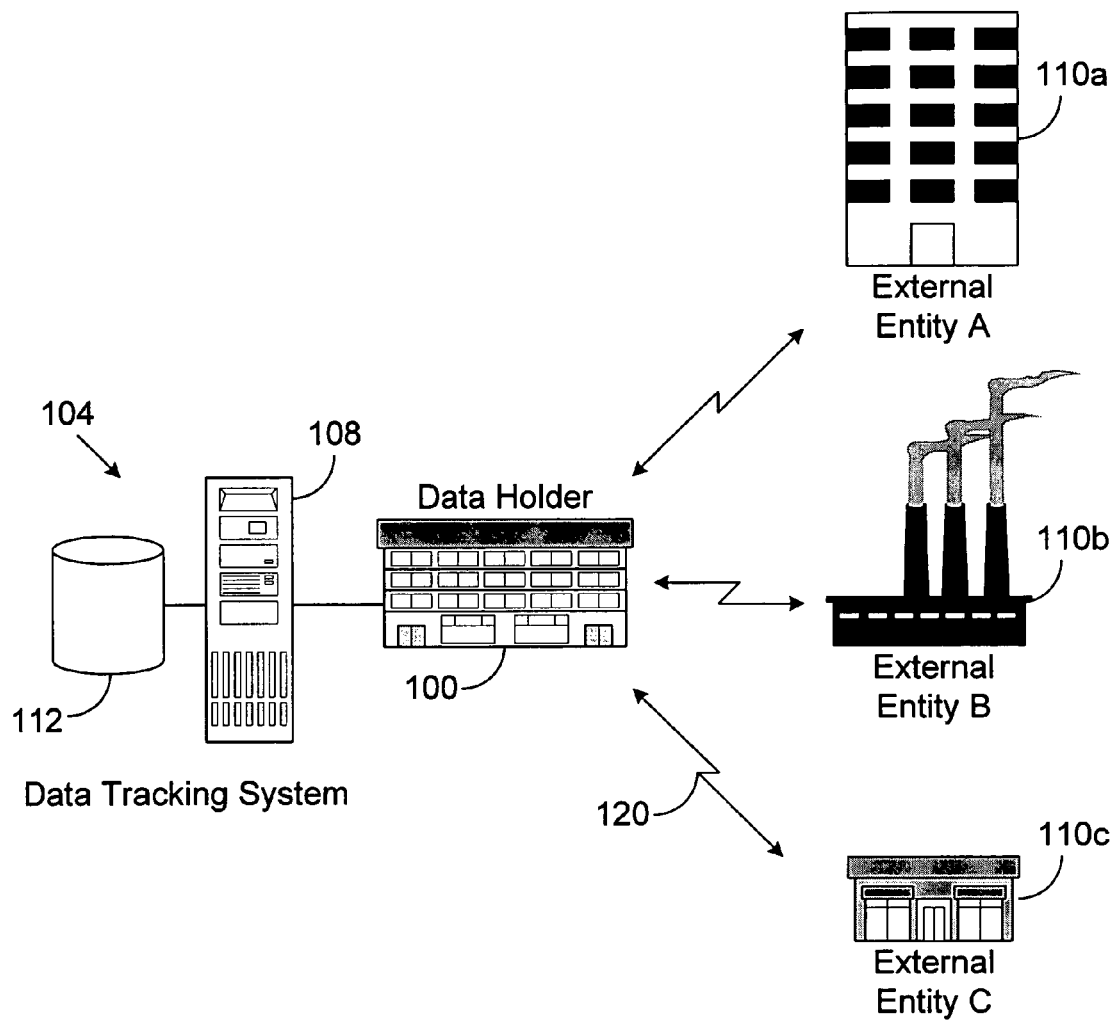
FIG. 1 illustrates a conceptual view of a tracking system according to some embodiments.

Various embodiments provide a system, and method therefor, for allowing a data holder, such as a company, to track data that is shared with, or otherwise transferred to, one or more external entities. Some embodiments address a problem that an organization or company faces when its ability to investigate the source of a leak of sensitive data is impeded because the organization or company cannot determine which external entities had access to that sensitive data. In particular, some embodiments provide a mechanism to identify which external entities had control of which data. Some embodiments also provide a system that may be used both to store in a tracking system database select characteristics of sensitive data that has been shared with external entities and to search in that database in order to identify external entities with which sensitive data of specific kind(s) has been shared.

In the event of an unauthorized release of sensitive data, the system facilitates investigations into the source of the unauthorized release. In particular, according to some embodiments, a search of a tracking system database (e.g., a search on the kind(s) of data that was released without authorization) can identify all external entities with which data of the released kind(s) was shared. Among all external entities, only those entities (potentially few in number) with which data of the released kind(s) had been shared could have been sources of the unauthorized release.

Systems that rely on saving copies of all information and materials that are shared with external entities cannot, under current computer memory and search capability capacities, be operated effectively for large organizations. For example, in large financial services organizations, thousands of paper and electronic documents are shared with external entities daily, either formally or informally, through physical or electronic exchange of documents, such as deliveries by postal services or other carriers and over electronic networks. Though many of these shared documents include data that is internal or proprietary to the financial services organizations, saving copies of all shared information and materials is not practically feasible. It is also not particularly useful because many of the documents, even if copies were saved, cannot be easily searched for relevant characteristics.

Some embodiments provide a system and method for keeping an inventory of data that is shared with external entities wherein the inventory can be easily searched for relevant characteristics. Some embodiments also include select characteristics (and groups of characteristics) for indexing information relating to the data being shared, as well as for information describing the data being shared. In particular, some embodiments provide a system and method for keeping an inventory of data shared with external entities, wherein the system and method do not require that copies of all shared information and materials be saved.

Some embodiments relate to systems (and associated methods) for tracking data or managing data, wherein the system comprises a network, a computer connected to the network and configured to receive one or more data characteristics of the data (the data characteristics including at least a data type for the data), and wherein the computer is further configured to receive one or more entity characteristics of an external entity with which the data is to be shared (the entity characteristics including at least a name for the entity). In some embodiments, the system further comprises a database connected to the computer, the database being configured to store a record of the one or more data characteristics and the one or more entity characteristics (the record being uniquely identifiable in the database; the record may also be recertified, e.g., on a predetermined schedule). In some embodiments, the data characteristics include at least a sensitivity score for the data, the entity characteristics include at least a risk-of-release rating for the entity, and the computer is configured to determine whether the data may be shared with the entity based on the sensitivity score for the data and the risk-of-release rating for the entity.

Some embodiments relate to a computer-readable medium having computer-readable instructions stored thereon, the computer-readable instructions comprising a data tracking module, and a user interface controllable by the data tracking module for allowing a user to input one or more data characteristics of the data (the data characteristics including at least a data type for the data), input one or more entity characteristics of an entity with which the data is to be shared (the entity characteristics including at least a name for the entity), and store a record of the one or more data characteristics and the one or more entity characteristics in a database (the record being uniquely identifiable in the database).

Some embodiments relate to a method of tracking data, the method comprising receiving one or more data characteristics of the data (the data characteristics including at least a data type for the data), receiving one or more entity characteristics of an entity with which the data is to be shared (the entity characteristics including at least a name for the entity), and storing a record of the one or more data characteristics and the one or more entity characteristics in a database (the record being uniquely identifiable in the database). Some embodiments relate to associated methods of managing data.

FIG. 1 illustrates an exemplary embodiment where a data holder 100 shares data with one or more external entities 110a, 110b and 110c. The term "external entities," as used herein, refers to all entities other than the data holder 100. The external entities 110a, 110b and 110c may be an individual person or an organization, such as a company or other business association, a philanthropic organization, an educational institution, or a governmental or private regulatory agency. It is also possible to have multiple external entities 110a, 110b and 110c within a single company, for example, the insurance group, the financial services group, the legal department, and so forth. And while these external entities 110a, 110b and 110c are typically separate from the data holder 100, they may also be related to the data holder 100 in some instances (e.g., a joint-venture, a subsidiary, etc.).

Data to be shared may be sent from the data holder 100 to the external entities 110a, 110b and 110c via any available means, including electronically through a wired and/or wireless network connection 120 (e.g., e-mail, fax, FTP, HTML, etc.), physically (e.g., paper documents, CD-ROMs, tapes, memory sticks, diskettes, etc.), or verbally (e.g., telephone conversation, in-person meeting, etc.). Similarly, the data shared by the data holder 100 may be any type of data or information (generally referred to herein as "data"), including account numbers, supplier/vendor lists, product release schedules, and the like, whether or not the data originated with the data holder 100 or was generated by a third party.

In accordance with some embodiments, the data holder 100 is connected or has access to a tracking system 104. The tracking system 104 functions in order to, among other reasons, provide an inventory of the various data transfers that have occurred (or will occur) between the data holder 100 and the external entities 110a, 110b or 110c. When data is to be sent (or has been sent, but not yet inventoried) by the data holder 100 to an external entity 110a, 110b or 110c, a user (e.g., an employee or associate) of the data holder 100 may use the tracking system 104 to create and store a record of the transfer. It is also possible to track data received by the data holder 100 from an external entity 110a, 110b or 110c, as will be discussed further below.

Thereafter, when another user (or the same user) wishes to know whether certain data has been externally shared (and with which external entity), he/she may use the tracking system 104 to search for the record of the data in question. The record provides the user with information regarding which external entities 110a, 110b and 110c were given, or otherwise had access to, certain data and, in some embodiments, the circumstances surrounding the transfer (e.g., the person responsible for the data, the date and/or frequency of the transfer, the type of data transferred, etc.). The user may also conduct a search, for example, based on a particular suspected external entity 110a, 110b and 110c in order to identify all data shared with that external entity and, hence, at risk of being released. Such an arrangement is extremely useful, for example, in quickly identifying one or more candidates as a source of an unauthorized release of data.

In some embodiments, the user may also use the tracking system 104 to automatically determine whether certain data is eligible to be shared with a particular external entity 110a, 110b or 110c. For example, most data has a certain sensitivity level or score pre-assigned to it (e.g., based on the type of data) or assigned on a case-by-case basis. Similarly, most external entities have a certain risk-of-release level or rating assigned to them based, for example, on their track record, security expertise, or type of entity (e.g., retailer, financial institution, etc.). Upon receiving this information from the user, the tracking system 104 compares the sensitivity score of the data at issue to the risk-of-release rating of the selected external entity 110a, 110b or 110c. Based on the results, the tracking system 104 informs the user whether or not the data in question may be shared with the particular external entity 110a, 110b or 110c.

The tracking system 104, in some embodiments, may comprise a tracking system computer 108 and a tracking system database 112 connected together. The tracking system database 112 may be any suitable database (e.g., organized using software such as MICROSOFT® Access, ORACLE® Database, etc.) capable of storing an inventory of the various data share events for the data holder 100. The tracking system computer 108 may be any suitable computing platform (e.g., mainframe, server, etc.) capable of creating new records for the data to be shared (or already shared, but not yet inventoried) in the tracking system database 112 and/or capable of searching the tracking system database 112 for existing records of previously shared data. Note that although the tracking system database 112 may be a separate hardware and/or software component from the tracking system computer 108, it is certainly possible to include the tracking system database 112 as a hardware and/or software component within the tracking system computer 108.

In some embodiments, the tracking system computer 108 may be a web server hosting a secure website or one or more secure hyperlinked web pages on an otherwise unsecured website. A user or employee of the data holder 100 may then access the website via the Internet using any commercially available web browser (e.g., Internet Explorer, Netscape, Mozilla, etc.). In other embodiments, the tracking system computer 108 may be a conventional application server hosting a proprietary online service accessible via a private network. Other implementations of the tracking system 104 known to those having ordinary skill in the art in light of the disclosure presented herein may also be employed.

Figure 2:
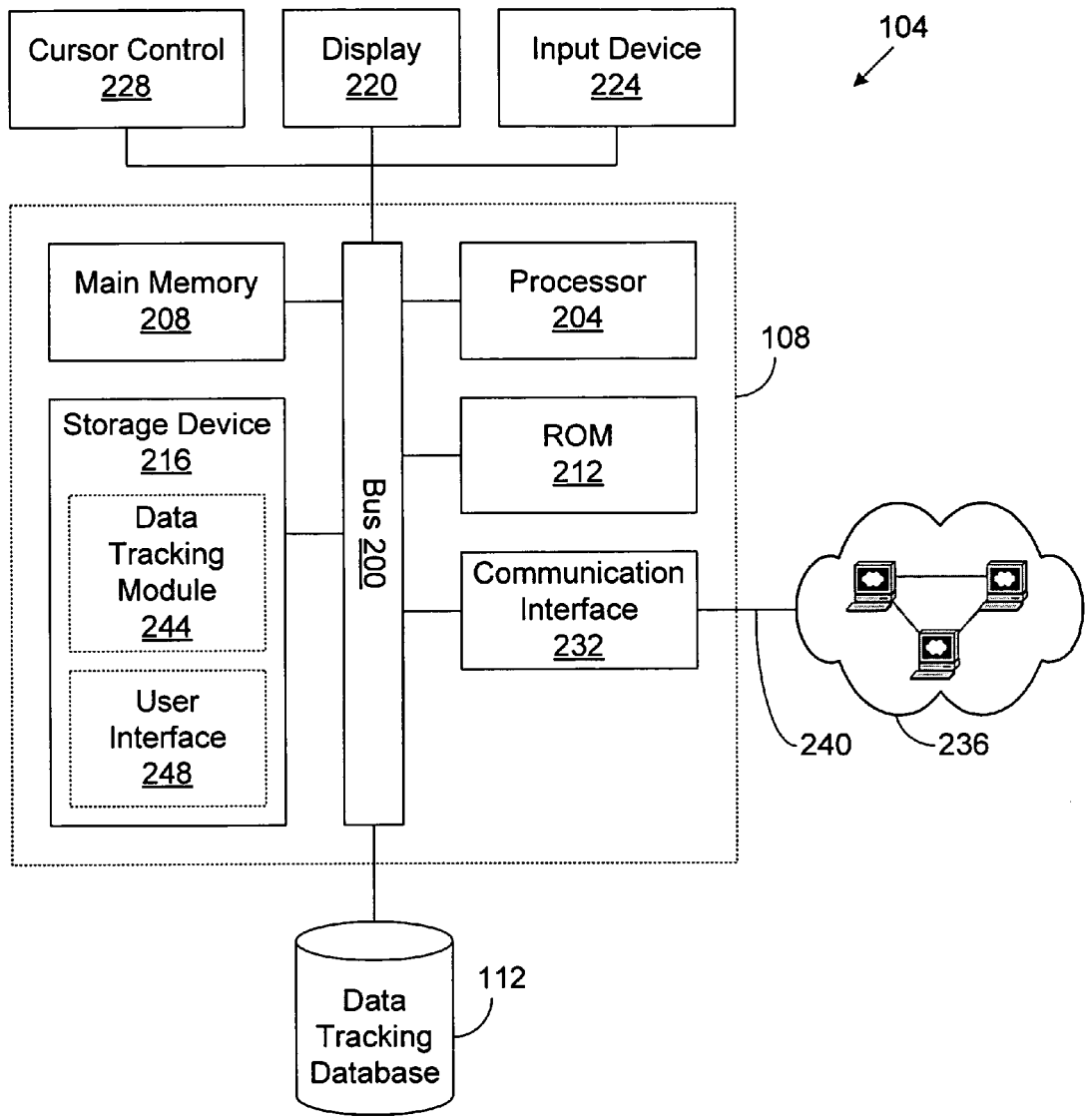
FIG. 2 illustrates a functional block diagram of a tracking system according to some embodiments.

FIG. 2 illustrates the tracking system computer 108 in more detail. The tracking system computer 108 comprises a number of standard computer components, including a bus 200 or other communication mechanism for communicating information and a processor 204 coupled with the bus 200 for processing information. The tracking system computer 108 also includes a main memory 208, such as a random access memory (RAM) or other dynamic storage device, coupled to the bus 200 for storing computer-readable instructions to be executed by the processor 204. The main memory 208 also may be used for storing temporary variables or other intermediate information during execution of the instructions to be executed by the processor 204. The tracking system computer 108 further includes a read-only memory (ROM) 212 or other static storage device coupled to the bus 200 for storing static information and instructions for the processor 204. A computer-readable storage device 216, such as a magnetic disk or optical disk, is coupled to the bus 200 for storing information and instructions for the processor 204.

The tracking system computer 108 may be coupled via the bus 200 to a display 220, such as a cathode ray tube (CRT), for displaying information to a user. An input device 224, including, for example, alphanumeric and other keys, is coupled to the bus 200 for communicating information and command selections to the processor 204. Another type of user input device is a cursor control 228, such as a mouse, a trackball, or cursor-direction keys for communicating direction information and command selections to the processor 204 and for controlling cursor movement on the display 220. The cursor control 228 typically has two degrees of freedom in two axes, a first axis (e.g., x) and a second axis (e.g., y), that allow the device to specify positions in a plane.

The term "computer-readable instructions" as used herein refers to any instructions or data that may be performed or used by the processor 204 or other components. Similarly, the term "computer-readable medium" refers to any storage medium that can store computer-readable instructions. Such a medium may take many forms, including, but not limited to, non-volatile media, volatile media, and transmission media. Non-volatile media include, for example, optical or magnetic disks, such as the storage device 216. Volatile media include dynamic memory, such as main memory 208. Transmission media include coaxial cables, copper wire and fiber optics, including wires of the bus 200. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of the computer-readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the tracking system computer 108 can receive the data on the telephone line and use an infrared transmitter to convert the data to an infrared signal. An infrared detector coupled to the bus 200 can receive the data carried in the infrared signal and place the data on the bus 200. The bus 200 carries the data to the main memory 208, from which the processor 204 retrieves and executes the instructions. The instructions received by the main memory 208 may optionally be stored on the storage device 216 either before or after execution by the processor 204.

The tracking system computer 108 also includes a communication interface 232 coupled to the bus 200. The communication interface 232 provides a two-way data communication coupling between the tracking system computer 108 and a network 236, such as a local area network (LAN) or the Internet. For example, the communication interface 232 may be an integrated services digital network (ISDN) card or a modem used to provide a data communication connection to a corresponding type of telephone line. As another example, the communication interface 232 may be a LAN card used to provide a data communication connection to a compatible LAN. A network link 240, which may be a wired or wireless link, typically provides data communication through the network 236 to other data devices. In any such implementation, the communication interface 232 sends and receives electrical, electromagnetic, optical, or other signals that carry digital data streams representing various types of information.

A data tracking module 244 and a user interface module 248 is stored on the tracking system computer 108, for example, in the storage device 216. The data tracking module 244 comprises a number of computer-readable instructions that, when executed by the tracking system computer 108, allow a user to create and store records of data share events on the tracking system database 112 in the manner described above. The user interface module 248 allows a user to interact with the data tracking module 244 to create and store the records (and subsequently retrieve the records). The records provide the user with information regarding which external entities 110a, 110b and 110c were given, or otherwise had access to, certain data and, in some embodiments, the circumstances surrounding the transfers. The user may also determine, for example, all data shared with particular external entity 110a, 110b or 110c if that external entity is suspected of a security breach. The data tracking module 244 also allows the user to track data received by the data holder 100 from an external entity 110a, 110b or 110c. In some embodiments, the data tracking module 244 also automatically determines whether certain data is eligible to be shared with a particular external entity 110a, 110b or 110c.

Figure 3A:
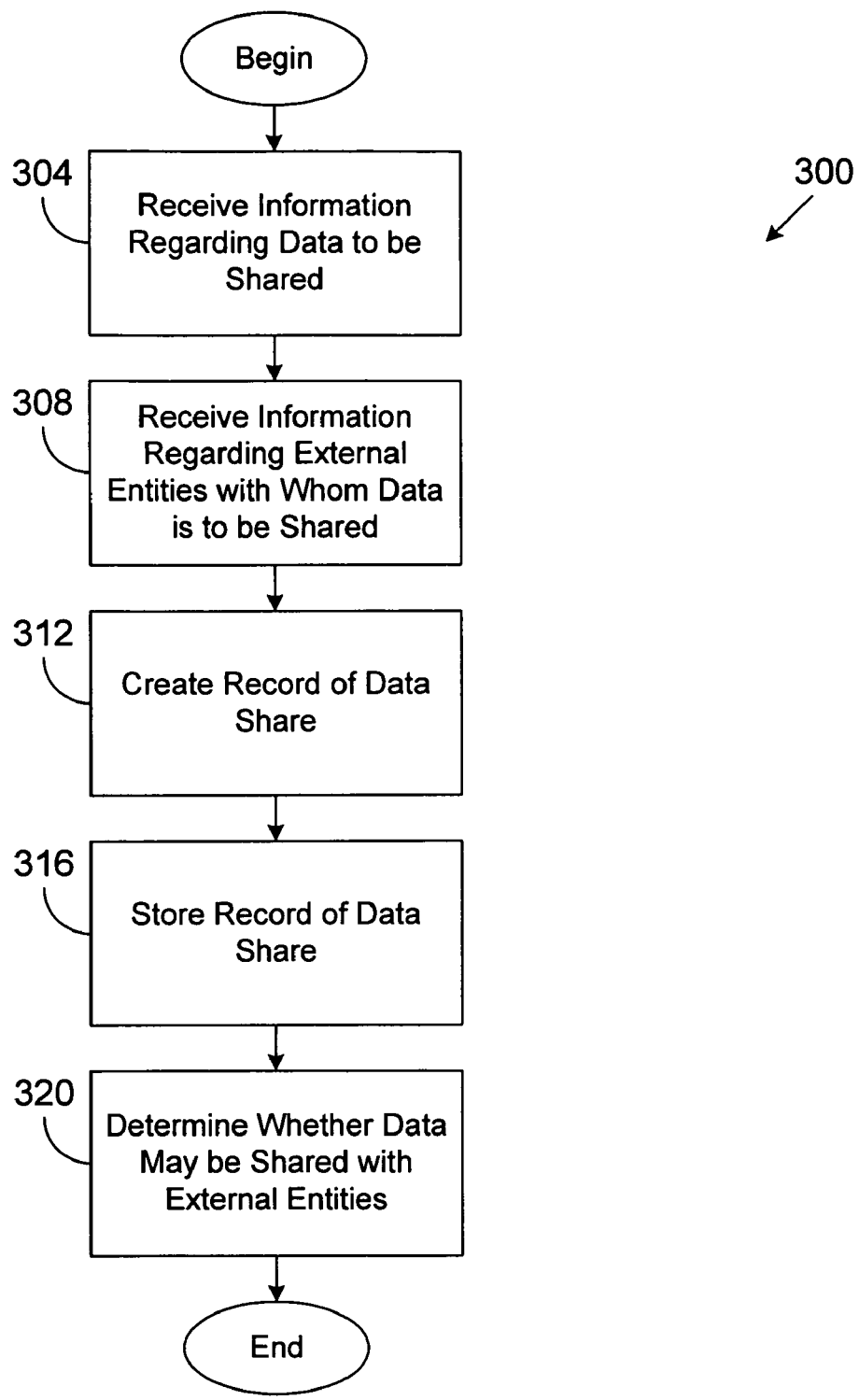
FIGS. 3A-3B illustrate exemplary flow charts that may be used with a tracking system according to some embodiments.
Figure 3B:
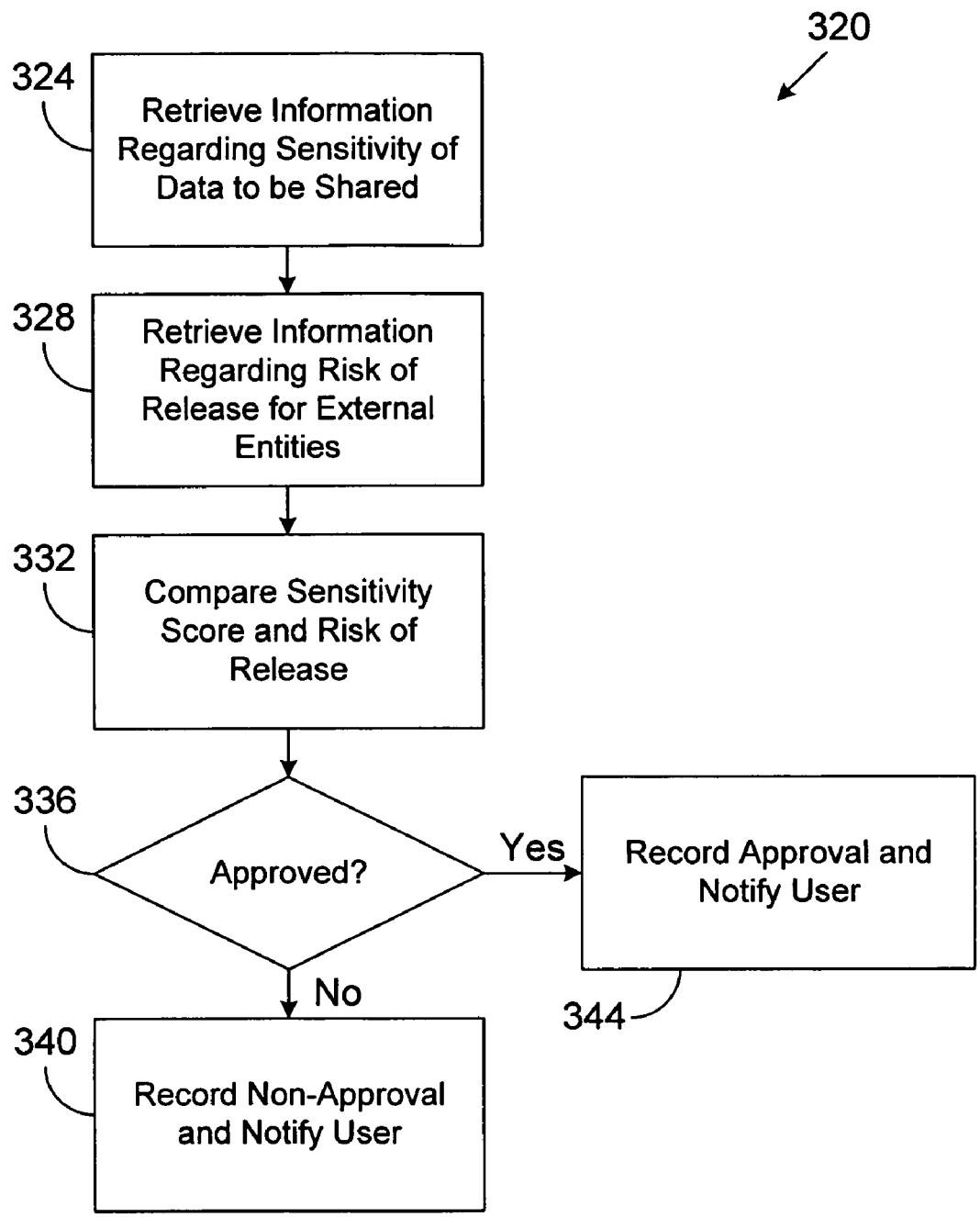

FIGS. 3A-3B illustrate the operation of the data tracking module 244 in more detail via flow charts 300 and 320. It should be noted that the flow charts 300 and 320 are exemplary only and numerous modifications, additions, and substitutions may be made thereto. For example, although the flow charts show a number of discrete blocks, those having ordinary skill in the art will recognize that two or more blocks may be combined into a single block, and an individual block may be divided into several constituent blocks.

Referring first to FIG. 3A, the flow chart 300 begins at block 304, where information regarding the data to be shared (or already shared, but not yet inventoried) is received by the data tracking module 244. The information may be any property or characteristic of the data, including the type of data, the sensitivity of the data, the name of the person primarily responsible for the data, the media on which the data is to be shared, and so forth. A more extensive list of possible properties and characteristics is provided later herein.

At block 308, information regarding the external entities 110a, 110b and 110c with which the data is to be shared (or already shared, but not yet inventoried) is received by the data tracking module 244. This information may be any property or characteristic of the external entities 110a, 110b and 110c, including the entity names, the risk-of-release rating, and so forth. The information may be received by the data tracking module 244 via manual input from the user, or it may be inputted automatically from an input file, or a combination of both (as is also the case for block 304 above).

At block 312, the data tracking module 244 creates a record of the contemplated data share event based on the information obtained from blocks 304 and 308. The data tracking module 244 then stores the record in the tracking system database 112 at block 316. Thereafter, any authorized user may search the tracking system database 112 for the record through the data tracking module 244 itself or via an alternative database search engine.

Depending on the data release policies at the data holder 100, the user may need to request approval from an appropriate person, such as a supervisor, department manager or the data holder's corporate security department, before sharing certain data (or continuing to share the data). The request may be made manually (e.g., interoffice mail), or the data tracking module 244 may provide the user with an option to send an electronic request for approval (e.g., an e-mail message) to the appropriate person. The electronic request preferably contains sufficient information regarding the data to be shared, such as the name of the user, the type of data, the sensitivity level, and the names of the external entities, to allow the relevant person(s) to make an informed decision.

In some embodiments, however, instead of sending a request, the data tracking module 244 may automatically determine whether the data may be shared with particular external entities 110a, 110b and 110c in question. This functionality is provided at block 320, shown in more detail via the flow chart of FIG. 3B.

As can be seen in FIG. 3B, the approval determination begins at block 324, where the data tracking module 244 retrieves information regarding the sensitivity level or score of the data to be shared. Similarly, at block 328, the data tracking module 244 retrieves information regarding the risk-of-release ratings for the external entities 110a, 110b and 110c at issue. The sensitivity scores and risk-of-release ratings are preferably provided by the user (or automatically inputted) at blocks 304 and 308 of FIG. 3A, but if not, the user may also be prompted to input the information at this point. Alternatively (or in addition), the sensitivity scores and risk-of-release ratings may be stored in the tracking system database 112 (e.g., in a lookup table) and automatically retrieved when the user enters the data and external entities information.

In some embodiments, certain data may be pre-assigned a sensitivity score by appropriate personnel (e.g., of a corporate security department) at the data holder 100. The personnel may pre-screen the data and assign a sensitivity score based on the nature of the data. Other data, perhaps less clearly defined, may be assigned a sensitivity score on a case-by-case basis by the user. The risk-of-release ratings may be pre-assigned by appropriate personnel at the data holder 100 who pre-screen certain well known external entities 110a, 110b and 110c and assign them a corresponding risk-of-release rating. Other external entities 110a, 110b and 110c who are less known or unknown may be assigned a risk-of-release rating by the user on a case-by-case basis. Exemplary listings of sensitivity scores and risk-of-release ratings, along with a brief description of each sensitivity score and risk-of-release rating, are provided below in tables of Examples 1 and 2, respectively:

Example 1

Sensitivity Scores

| Sensitivity | Description |
| --- | --- |
| S1 | unrestricted |
| S2 | internal use only |
| S3 | confidential |
| S4 | restricted |
| S5 | attorney-client privileged |

Example 2

Risk-of-Release Ratings

| Risk of Release | Description |
| --- | --- |
| R1 | may only receive data having a sensitivity score of "unrestricted" |
| R2 | may receive data having sensitivity scores up to "internal use only" |
| R3 | may receive data having sensitivity scores up to "confidential" |
| R4 | may receive data having sensitivity scores up to "restricted" |
| R5 | may receive data having sensitivity scores up to "attorney-client privileged" |

Next, the data tracking module 244 performs a comparison at block 332 of the sensitivity score for the data to be shared and the risk-of-release rating for the external entities 110a, 110b and 110c in question. In some embodiments, the comparison may be a straight comparison of the sensitivity score to the risk-of-release rating. If the sensitivity score of the data to be shared is higher than the risk-of-release rating for the external entity in question, then the data may not be shared. Thus, for example, data having an "S4" sensitivity score may not be shared with any external entity having a risk-of-release rating of "R3" or lower. Example 3 illustrates an exemplary "decision matrix" resulting from such a comparison, where "A" stands for "approved" and "N" means "not approved."

Example 3

Decision Matrix

| | | Risk-of-Release Rating for External Entity | | | | |
| --- | --- | --- | --- | --- | --- | --- |
| | | R1 | R2 | R3 | R4 | R5 |
| Sensitivity | S1 | A | A | A | A | A |
| of | S2 | N | A | A | A | A |
| Data | S3 | N | N | A | A | A |
| | S4 | N | N | N | A | A |
| | S5 | N | N | N | N | A |

In addition to the automated determination of the data tracking module 244, the "decision matrix" in Example 3 may also be used as a guide by appropriate personnel of the data holder 100 to manually decide whether to approve a request to share internal or proprietary data with an external entity. The manual determination is typically needed when a request for approval has been submitted in paper form. In that case, reliance on a decision matrix helps the personnel avoid making a subjective or an arbitrary decision.

Instead of (or in addition to) "decision matrices," some embodiments also encompass the use of algorithms that employ more nuanced assessments than the above-described risk-of-release ratings and sensitivity scores. For example, assessments may be used that are described through equations that are multivariate or polynomial in nature, or that make use of the risk-of-release ratings, sensitivity scores or other variables in ways that may be best described using tools of advanced statistics. Other factors may also be taken into account, such as business opportunities, state and/or federal privacy requirements, contractual obligations, and the like.

At block 336, the data tracking module 244 makes a determination as to whether the data is approved to be shared based on the results of the comparison at block 332 for each external entity 110a, 110b or 110c in question. If the data is approved to be shared with a particular external entity, then the data tracking module 244 records the approval and notifies the user accordingly at block 340. On the other hand, if the data is not approved to be shared with a particular external entity, then the data tracking module records the non-approval and again notifies the user accordingly at block 344.

In operation, a user who is requested (or who foresees a need) to share internal or proprietary data with an external entity 110a, 110b or 110c may access the tracking system 104, for example, via a web site hosted by the tracking system computer 108. Once access is gained, the user may be requested to complete an online data inventory form to create a record for a data share event. As detailed in the examples below, one or more characteristics of the data to be shared are entered in fields on the data inventory form. The characteristics may include, for example, information related to the data to be shared (e.g., name of employee primarily responsible for data, media on which the data is to be shared, etc.) as well as information directly describing the data being shared (e.g., member name, address, social security number, credit card number, etc.). Entries for these select characteristics may then be saved in the tracking system database 112. In some embodiments, the completed form may be submitted as part of a manual or electronic request for permission from appropriate personnel at the data holder 100 to share the data with an external entity 110a, 110b or 110c.

If the data holder 100 later learns that data has been released without its authorization, a search of the tracking system database 112 may identify those external entities 110a, 110b and 110c that could have been the source of the unauthorized release (i.e., those external entities with which the data holder 100 previously shared data of the kind(s) that were released without authorization). This same search could also exonerate those external entities 110a, 110b and 110c that did not receive data of the kind(s) that were released without authorization.

The usefulness of the tracking system 104 according to some embodiments is not limited to helping identify an external entity as a source of an unauthorized release. Even if all external entities were to release data only after receiving appropriate authorization (i.e., there were no unauthorized releases of sensitive data), the tracking system 104 is also useful for purposes of information security management. That is, the tracking system 104 according to some embodiments also allows a company to quantify and characterize all data that is shared with external entities 110a, 110b and 110c.

FIGS. 4A-4D illustrate an example of a data inventory form 400 (also known as a data shared form) that may be used to create a record of the data to be shared according to some embodiments. The exemplary data inventory form 400 shown here, in one embodiment, is an online web form having a plurality of fields that personnel of the data holder 100 may fill in to characterize the data to be shared. Fields may be of any suitable types, including alphanumeric fields, selection fields (e.g., radio buttons, check boxes, etc.), and drop-down lists.

In this particular embodiment, related fields may be grouped together in one or more sections, for example, an "Information Release Detail" section 404, a "Primary Point of Contact" section 408, an "Alternate Point of Contact" section 412, and a "Third Party Receiving Data" section 416.

Other sections that may be present include a "Shared Data and Method of Sharing" section 420 and 424, a "Security" section 428 and a "Company Attorney Information" section 442. Each of these sections is briefly described below.

As can be seen, the exemplary "Information Release Detail" section 404 includes fields capturing information that uniquely identifies a record, such as an information release number, the date the record was created, the most recent certification date, and so forth. The fields in the "Information Release Detail" section 404 are typically filled in by the tracking system 104.

The exemplary "Primary Point of Contact" section 408 includes fields capturing information that identifies the person primarily responsible for the data at the data holder 100. These fields may include fields for the person's employee ID number, name, job title, phone number, department and the like. The exemplary "Alternate Point of Contact" section 412 includes fields capturing information that identifies an alternative contact person for the data at the data holder 100. These fields may include many of the same fields contained in the "Primary Point of Contact" section 408.

The exemplary "Third Party Receiving Data" section 416 includes fields capturing information that identifies the external entity 110a, 110b or 110c with whom data is to be shared (or with whom has already been shared). These fields may include fields for the name of the external entity, the address of the external entity, and the point of contact for the data within the external entity 110a, 110b or 110c.

The exemplary "Shared Data and Method of Sharing" section 420 and 424 includes fields characterizing the data to be shared (or already shared) and identifying the sharing mechanism. These fields capture the various properties and characteristics of data, such as account owner or "member" data (e.g., address, bank account number, date of birth, credit card number, driver's license, etc.) and employee data (e.g., address, medical information, password, salary, etc.). The fields of the "Shared Data and Method of Sharing" section 420 and 424 may further include fields capturing the sharing direction (e.g., send, receive, both) and the sharing method (e.g., paper, e-mail, diskette, CD/DVD/optical, FTP, website, etc.). Where a physical medium is used to share the data, there may be fields in this section to indicate the various physical media types (e.g., delivery service, hand carried, postal service, etc.). There may also be fields to indicate whether the sharing is a one-time occurrence or a repeated occurrence (e.g., daily, weekly, monthly, etc.). Other fields that may be present in this section include fields indicating the date of first sharing and the list of personnel at the external entity 110a, 110b or 110c with access to the data.

The exemplary "Security" section 428 includes fields capturing various security related aspects in connection with the sharing. These fields may comprise a field for the sensitivity score of the data (see Example 1), including whether or not the data is attorney-client privileged, and a field for inputting the purpose of the data sharing. Other possible fields present in this section include a field identifying any security controls that may be in place (e.g., enhanced security on transmission, on-site security evaluation, contractual controls, etc.), whether the data sharing is a contractual obligation and, if so, whether the obligation is stated in the contract and any applicable contract control numbers.

Finally, the exemplary "Company Attorney Information" section 442 includes fields (e.g., identification number, name, job title, phone number, etc.) identifying an attorney of the data holder 100. These fields may also include a field to indicate whether any legal exemptions may apply to the data sharing, such as might be contained in the GLBA mentioned above.

In some embodiments, the online data inventory form 400 is designed so that responsive information must be entered within certain fields before a user may enter information in later fields (or before the user may save a "completed" form). Entries from fields of the online data inventory form 400 are then stored in a tracking system database. Searches on the tracking system 104 may thereafter be accomplished to identify external entities 110a, 110b and 110c with which data of specific kind(s) have been shared. Modifications and updates may also be made to the information entered in the data inventory form 400 as needed.

In the online web form embodiments described above, entries from fields of the online data inventory form 400 may be saved to the tracking system database 112. In other embodiments, however, entries from some fields may not be saved to the tracking system database 112. For example, if the entries in the data inventory form 400 indicate the data is not shared physically, then fields related to physical media may be omitted from subsequent presentations of the data inventory form 400 for the particular data in question.

In some embodiments, the data inventory form may be a paper form that is used to list one or more characteristics for the data to be shared. Data entry personnel may then re-key the entries for the fields on the paper form into corresponding fields in an online version of the data inventory form for eventual storage of data characteristics in an electronic tracking system database.

Referring to FIG. 5, a paper data inventory form 500, also known as a preliminary data shared form, is depicted. This preliminary form 500 may include many of the same or similar fields as the online data inventory form 400, with related fields grouped together in one or more sections. For example, the preliminary data inventory form 500 may include a "Point of Contact Information" section 504, the fields of which capture information (e.g., name, title, phone number, etc.) regarding the person primarily responsible for the data to be shared (or already shared). The preliminary data inventory form 500 may also include an exemplary section 508 called "Information on External Entity Receiving Company Data," the fields of which capture information (e.g., name, address, phone number, etc.) regarding the external entity 110a, 110b and 110c with which data is to be shared. Also present may be a section 512 called "Data Classification and Handling," the fields of which capture information (e.g., type of data, media used, method of sending, frequency of sharing, etc.) regarding the characteristics of the data to be shared and the circumstances surrounding the sharing.

The preliminary data inventory form 500, in some embodiments, may not be as extensive as the data inventory form 400 (see FIGS. 4A-4D) and may therefore be considered preliminary. For example, a preliminary data inventory form like one represented in FIG. 5 may not include a field (i.e., a data entry line or space) for assigning or recording a sensitivity score for a data element. The preliminary data inventory form 500 may also be considered preliminary because it may be submitted to a representative of a corporate security department (or other personnel of the data holder 100 having authority to give approval to, or deny approval for, a data sharing proposal) before completing a more extensive online data inventory form.

An employee requesting permission to share data with an external entity commonly completes the preliminary data inventory form 500 and submits same to appropriate personnel of the data holder 100 (e.g., an employee of a corporate security department). The preliminary data inventory form 500 may then be used by the personnel to make an initial assessment on the propriety of a data sharing proposal (this assessment may include, for example, also receiving a suggested sensitivity score for the data in question).

The personnel are also thereby notified that a risk-of-release rating for the external entity in question is needed. In other embodiments, however, those who are completing the data inventory form 500 in conjunction with seeking permission to share data with an external entity may assign risk-of-release rating(s) to the external entity (or entities). The company may implement policies for reviewing data inventory forms on which company personnel have assigned risk-of-release rating(s) to an external entity (or entities) [or sensitivity scores to data for which approval to share is being sought] in order to provide oversight to the assignment of these rating(s) [and scores].

In some embodiments, whether using an online web form or a paper form, appropriate personnel may periodically update certain fields for one or more records in the tracking system database 112 to ensure that they are current. Some of the information that may be updated includes, for example, the sensitivity information (e.g., the data has become more confidential). This is particularly useful, for example, when the internal sensitivity scheme of the data holder 100 has changed (e.g., the data holder 100 has issued new sensitivity guidelines for the various kinds of internal or proprietary data).

Other information that may be updated includes the point of contact information (e.g., when the person primarily responsible for the data has changed jobs). When a point of contact is changed in the tracking system database 112, the tracking system 104 may automatically notify that point of contact's supervisor (or an appropriately designated person) so that a new point of contact may be appointed. The notification may of course also occur manually (e.g., via interoffice mail) as an alternative, or in addition, to the automatic notification. In some embodiments, the tracking system 104 may be tied to a human resource (HR) system of the data holder 100 such that changes in the personnel of the data holder 100 are automatically updated in the tracking system 104. The tracking system 104 may then automatically notify a supervisor for a point of contact as soon as the change occurs without having to wait for someone to enter the change in the tracking system database 112.

In some embodiments, the updates may occur in the form of a recertification that reconfirms the appropriateness or necessity of the data sharing. The recertification may occur according to a predetermined schedule, such as quarterly for all records, or every month for certain individual records, regardless of whether there has been a change in the information stored.

Thus far, the tracking system 104 has been described mainly with respect to the tracking system computer 108 and the data tracking module 244. The following is a more detailed description of the tracking system database 112. FIGS. 6A-6E illustrate an exemplary database architecture 600 that may be used to implement the tracking system database 112. In the example shown, the database architecture 600 is a MICROSOFT® Access database architecture, but other commercially available database software may also be used. It should also be noted that the database architecture 600 is an example only, and that other database architectures may be designed according to the needs of the data holder 100.

Figure 6A:
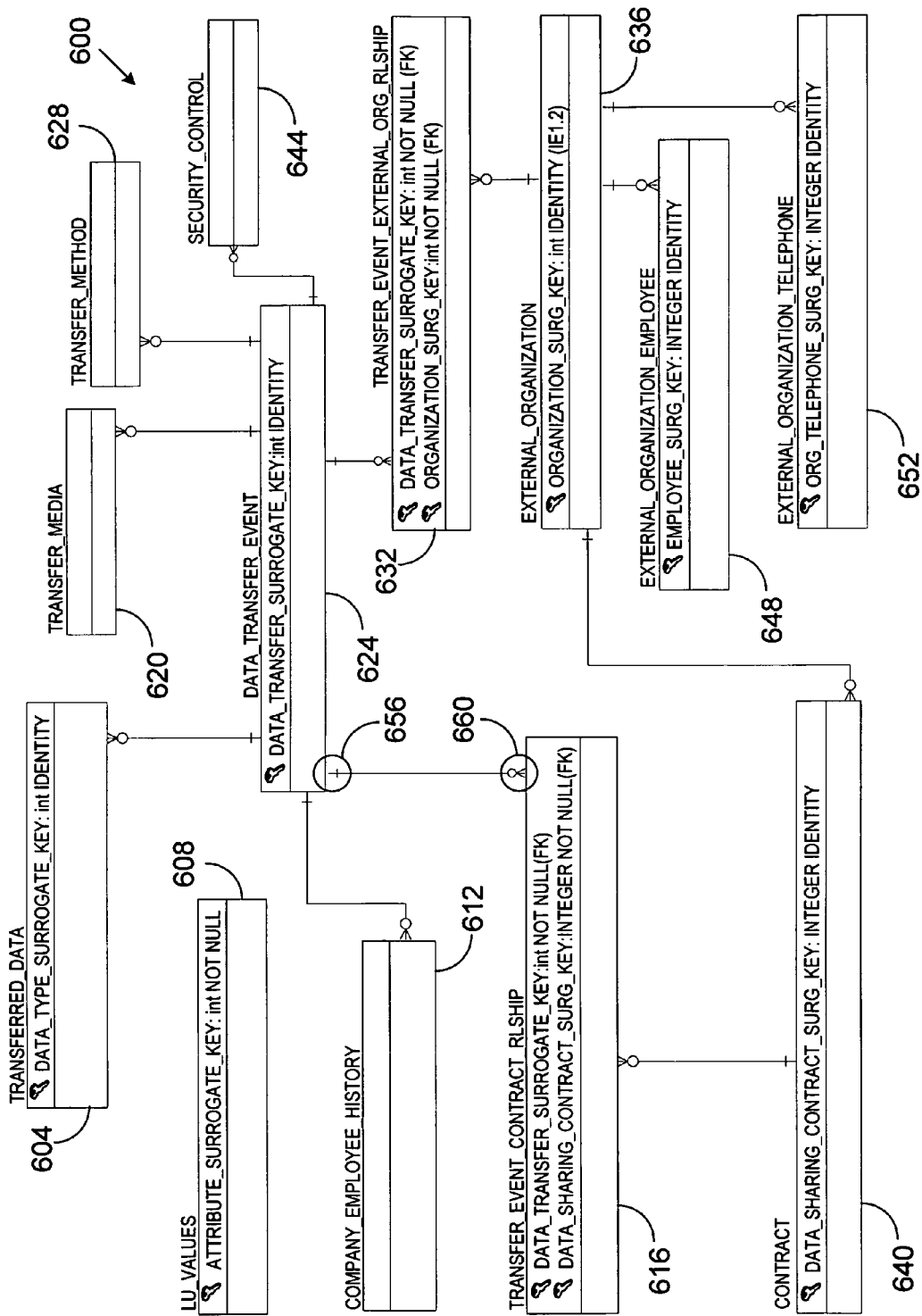

Referring to FIG. 6A, the tracking system database 112 is a relational database that includes a plurality of interrelated database tables. Each database table contains one or more database fields (i.e., columns in the database table) that correspond to the fields of the data inventory form 400 (see FIGS. 4A-4D). Information entered in the fields of the data inventory form 400 are stored under the corresponding database fields of the database tables. Exemplary database tables may include the following of Example 4:

Example 4

Exemplary Database Tables

Transferred_Data 604
Lu_Values 608
Company_Employee_History 612
Transfer_Event_Contract_Rlship 616
Transfer_Media 620
Data_Transfer_Event 624
Transfer_Method 628
Transfer_Event_External_Org_Rlship 632
External_Organization 636
Contract 640
Security_Control 644
External_Organization_Employee 648
External_Organization_Telephone 652

These database tables are related to each other in what is generally referred to as a "one-to-many" relationship, meaning that a single database field in one database table may be linked to two or more database fields in another database table. The various relationships are illustrated in FIG. 6A using standard connector notations 656 and 660 known to those having ordinary skill in the art, with the connector indicated at 656 representing a "one" relationship and the connector at 660 representing a "many" relationship. A brief description of the relationship between the various database tables is provided below, following which is an explanation of the function of each database table.

As shown in FIG. 6A, there is a one-to-many relationship between the Data_Transfer_Event database table 624 and at least seven other database tables, namely, the Transfer_Data database table 604, the Company_Employee_History database table 612, the Transfer_Event_Contract_Rlship database table 616, the Transfer_Media database table 620, the Transfer_Method database table 628, the Transfer_Event_External_Org_Rlship database table 632, and the Security_Control database table 644. In some embodiments, there is also a one-to-many relationship between the External_Organization database table 636 and four other database tables, namely, the Transfer_Event_External_Org_Rlship database table 632, the Contract database table 640, the External_Organization_Employee database table 648, and the External_Organization_Telephone database table 652. Finally, there is a one-to-many relationship between the Contract database table 640 and the Transfer_Event_Contract_Rlship database table 616.

Some of the database tables have database elements that are designated surrogate keys (indicated by the key symbol). The use of key designations in a relational database is well known to those having ordinary skill in the art and will be described only briefly here. In general, there are two types of key designations: primary key and surrogate key. A primary key database field uniquely identifies each row in a database table and allows the rows of one database table to be linked to the rows of another database table. Surrogate key database fields are similar to primary key database fields except that their values are internally generated by the database software and are normally not seen by the user. A surrogate key is often used when there are no database fields that can uniquely identify the rows in the database table (e.g., one or more people may have the same first and last names). Examples of the surrogate key database fields that may be used in the tracking system database 112 are listed below in Example 5:

Example 5

Primary Keys and Surrogate Keys

636 stores information pertaining to the external entity involved in the contemplated data transfer. In addition to the surrogate key, this database table 636 contains one or more database fields that are directed to, for example, the address of the external entity, the country of the external entity, and the like.

The exemplary Contract database table 640 stores information pertaining to any contracts involved in the contemplated data transfer. In addition to the surrogate key, this database table 640 contains one or more database fields that

| Database Table | Key Database Elements |
| --- | --- |
| TRANSFERRED_DATA | DATA_TYPE_SURROGATE_KEY: int IDENTITY |
| LU_VALUES | ATTRIBUTE_SUROGATE_KEY: int NOT NULL |
| TRANSFER_EVENT_CONTRACT_RLSHIP | DATA_TRANSFER_SURROGATE_KEY: int NOT NULL (FK) |
|  | DATA_SHARING_CONTRACT_SURG_KEY: INTEGER NOT NULL (FK) |
| DATA_TRANSFER_EVENT | DATA_TRANSFER_SURROGATE_KEY: int IDENTITY |
| TRANSFER_EVENT_EXTERNAL_ORG_RLSHIP | DATA_TRANSFER_SURROGATE_KEY: int NOT NULL (FK) |
|  | ORGANIZATION_SURG_KEY: int NOT NULL (FK) |
| EXTERNAL_ORGANIZATION | ORGANIZATION_SURG_KEY: int IDENTITY (IE1.2) |
| CONTRACT | DATA_SHARING_CONTRACT_SURG_KEY: INTEGER IDENTITY |
| EXTERNAL_ORGANIZATION_EMPLOYEE | EMPLOYEE_SURG_KEY: INTEGER IDENTITY |
| EXTERNAL_ORGANIZATION_TELEPHONE | ORG_TELEPHONE_SURG_KEY: INTEGER IDENTITY |

The functions of the above database tables are explained with reference to FIGS. 6B-6E. As can be seen, the Transferred_Data database table 604 stores information pertaining to the properties and characteristics of the data to be transferred (or already transferred). In addition to the surrogate key, the Transferred_Data database table 604 contains one or more database fields that are directed to, for example, the type of data, sensitivity of the data, the sharing mechanism, the start and end dates of the sharing, and the like.

The exemplary Company_Employee_History database table 612 stores information pertaining to personnel wishing to share proprietary data (or continue sharing the data). This database table 612 contains one or more database fields that are directed to, for example, employee identification number, job description, and the like.

The exemplary Transfer_Event_Contract_Rlship database table 616 stores information pertaining to contractual relationships affecting the contemplated data transfer. This database table 612 contains one or more surrogate key database fields.

The exemplary Transfer_Media database table 620 stores information pertaining to the media, if any, used to conduct the contemplated data transfer. This database table 620 contains one or more database fields that are directed to, for example, the type of media used.

The exemplary Data_Transfer_Event database table 624 stores information pertaining to the contemplated data transfer itself. In addition to the surrogate key, this database table 624 contains one or more database fields that are directed to, for example, the direction of the transfer, date of first sharing, frequency of sharing, expected date when the data will be destroyed or returned, and the like.

The exemplary Transfer_Method database table 628 stores information pertaining to the method of transfer for the contemplated data transfer. In addition to the surrogate key, this database table 628 contains one or more database fields that are directed to, for example, the physical handling of the data.

In certain embodiments, the exemplary External_Organization database table 636 may be in a one-to-many relationship with Transfer_Event_External_Org_Rlship database table 632 (FIG. 6A); External_Organization database table are directed to, for example, the contract number for the contract involved, the particular contract provision affected, and the like.

The exemplary Security_Control database table 644 stores information pertaining to the security surrounding the contemplated data transfer. This database table 644 contains one or more database fields that are directed to, for example, any existing security controls or controls that have been put in place for the data transfer.

The exemplary External_Organization_Employee database table 648 stores information pertaining to the employees of the external entity who have access to the data in the contemplated data transfer. In addition to the surrogate key, this database table 648 contains one or more database fields that are directed to, for example, the external employee names, job titles, and the like.

The exemplary External_Organization_Telephone database table 652 stores information pertaining to external entity's telephone numbers. In addition to the surrogate key, this database table 652 contains one or more database fields that are directed to, for example, the telephone number of the external entity.

Several specific embodiments, along with examples therefor, have been discussed thus far. Following now is a description of some of the properties and characteristics a tracking system (and related methods) that embodiments may have.

Generally, a tracking system (and related methods) for keeping inventories of data shared with external entities includes many characteristics in addition to the characteristic of having (or not having) entries in the fields from an online data inventory form be stored to a tracking system database. Examples of some of the general characteristics to a system according to some embodiments may include the ability to transfer data from surveys completed by employees on data that has been released. The system may be able to verify all data on a quarterly basis. The system may be able to support multiple concurrent users. The system may be secure. The system may have the ability to provide delegate capabilities. The system may provide the ability for an individual user to name his/her own delegate. The system may be able to disable the ability to delete data inventory forms during initial load.

The system may provide "Help" functionality for every field. The system may provide error messages and correction procedures associated with application edits.

A tracking system (and related methods) according to some embodiments may have the following interface characteristics. The system may provide the ability to maintain the data inventory forms via a web interface. The system may make the forms accessible from a designated security management website. The system may provide the ability to manage security access to the system via an administrative interface. The system may have an administration interface that provides the ability to add new users to application user list, modify the users on the user list, and delete users from the user list. The system administration interface may provide the ability to reassign ownership of the data inventory forms. The system may limit the ability to change the data inventory form to data owned by the submitter. Once ownership is transferred, the original owner may not make any updates in some embodiments. The system may provide the ability to make changes to data inventory form in real time. The system may provide the ability to update data inventory form by contract. The system may provide the ability to modify point of contact as ownership of a data inventory form changes.

A tracking system (and related methods) according to some embodiments may have the following additional interface characteristics. The system may provide the ability to make all data editable (e.g., subject to change/deletion). The system may provide the ability to keep historical data. The system may provide one method for entering common elements. The system may provide another method for entering other elements. The system may provide a lookup table with data elements. The system may provide the ability to add "new" data elements. The system may use the same name for like (similar) data elements (a development project coordinator may ensure that data element fields are at least consistent). The system may support international address format. Address field may be split as Address/City/State/Zip/Country. The system may support international phone format. The system may support the date format mm/dd/yyyy.

A tracking system (and related methods) according to some embodiments may also have the following database characteristics. The system may provide data elements and domain values as defined in a data dictionary. The system may be standardized and defined to an integrated dictionary facility.

A tracking system (and related methods) according to some embodiments may have the following point of contact characteristics. The system may provide the ability to capture point of contact name as a required field. The system may provide the ability to capture point of contact job title as an optional field. The system may provide the ability to capture employee ID as a required field. The system may provide the ability to capture employee e-mail address as a required field. The system may provide the ability to capture last review date as a required field. The system may provide the ability to capture company (or staff agency, i.e., CoSA) as a required field. The system may make CoSA a dropdown field. The system may provide the ability to capture a secondary point of contact name.

A tracking system (and related methods) according to some embodiments may have the following external entity characteristics. The system may be able to capture the name, street address, city, state, and country of the external entity as required fields. Thus system may be able to capture the point of contact, phone numbers therefor, and purpose for receiving the data as required fields.

A tracking system (and related methods) according to some embodiments may have the following data classification and handling characteristics. The system may provide the ability to capture data being shared as a required field. The system may provide the ability to capture in separate Boolean fields whether account holder data being shared is of each of the following types: a driver's license number, a government issued ID number, a tax ID number, a bank transit routing number, a credit/debit card number, a credit/debit card security code, a personal ID number (pin), a password, a mother's maiden name, a digitized signature, medical information, a cause of death, a credit score, an e-mail address, a vehicle ID number (VIN) and a salary/income value, a commission/enlistment date, a military status indicator, a branch of service listing and a military rank grade. According to some embodiments, the system may provide the ability to capture in separate Boolean fields whether employee data being shared is of each of the following types: a personal ID number (pin), a password, a mother's maiden name, a digitized signature, medical information and an e-mail address.

According to some embodiments, the system may provide the ability to capture (as a required field in some embodiments) in separate Boolean fields whether the release method for data that is being shared uses one of each of the following types: a CD/DVD/optical format, FTP format, e-mail format or other format. The system may provide a text box when "other" is selected as a release format.

According to some embodiments, the system may provide the ability to capture (as a required field in some embodiments), in separate Boolean fields whether a physical release method for data that is being shared is of each of the following types: "hand carried" or via delivery service (e.g., FedEx, UPS, etc.).

According to some embodiments, the system may provide the ability to capture as a required field (e.g., as a Boolean field) whether a release is a one-time event. The system may further provide the ability to capture the release frequency (if a release is not a one-time event) as a required field, as well as to capture dates on which data is sent. The system may provide the ability to capture as a memo field the person in the external entity who will have access to the shared data.

According to some embodiments, the system may provide the ability to capture as a required field (e.g., a Boolean field) whether there is a contract in place with the receiving entity. The system may provide the ability to capture the contract number if a contract is in place, as well as data sharing provisions of the contract (e.g., as Boolean fields). The system may provide the ability to capture as a required field (e.g., as a Boolean field) whether data will be released by the external entity to another 3rd party. The system may further provide the ability to capture the name of the party receiving the data if data is being released to another 3rd party. The system may also provide the ability to capture the end date of data sharing relationship.

A tracking system (and related methods) according to some embodiments may have the following maintenance field characteristics. The system may provide the ability to store the last reviewed date, as well as the ability to store the review frequency (e.g., in months).

A tracking system (and related methods) according to some embodiments may have the following reporting characteristics. The system may provide the ability to retrieve data by data element. The system may provide the ability to produce ad hoc queries. The system may provide the ability to retrieve data by combination of multiple data elements. The system may provide the ability to export data (e.g. in a MICROSOFT® EXCEL® spreadsheet). The system may make a reporting tool available only to an administrator. The system may insure that data retrieval access is secure. The system may provide the ability to notify system administrators when data has been updated. The system may provide the ability to notify system administrators when data has not been updated. The system may not provide any pre-defined reports. The system may provide the ability to create a report for all point-of-contact personnel with corresponding e-mail addresses. The system may provide the ability to automate notification.

A tracking system (and related methods) according to some embodiments may have the following audit characteristics, namely, an ability to provide the date of the last review.

A tracking system (and related methods) according to some embodiments may have the following performance/availability characteristics. The system may provide system reliability of 99% during normal business hours and days and be available during those hours and days. The system may be able to resume operations in case of disaster within 30 days. The system may provide the capability for web pages to load in five seconds or less (server response time) at least 80% of time. The system may provide the capability to support 500 concurrent users.

A tracking system (and related methods) according to some embodiments may have the following help desk characteristics. The system may provide the contact information for the IT (information technology) application support area. The system may provide contact information for unauthorized user assistance on the login page.

A tracking system (and related methods) according to some embodiments may have the following additional characteristics, namely, that the system need not track subsequent individual recipients of data after the data is provided to a 3rd party.

Such a tracking system having the characteristics described above allows a data holder to quickly identify candidates for possible sources of an unauthorized release of sensitive data. The following is an example, centered on the state of Arizona, of how the tracking system may be used after an unauthorized release.

Possibly while interviewing individuals from Arizona who have notified the data holder that they are receiving an unusually high volume of mail and e-mail solicitations for auto insurance, a data holder representative may determine that address data and e-mail address data of account holders who live in Arizona have been released without authorization. The representative then uses the tracking system of some embodiments to search a database 112 of a data tracking system using "address" and/or "e-mail address" characteristics in order to identify those external entities 110a, 110b and 110c with which the data holder 100 shared address data and/or e-mail address data for account holders who live in Arizona.

The representative may determine that other data also has been released without authorization (e.g., credit card data, date-of-birth data, etc.) of account holders who live in Arizona. In this case, the representative may further focus the search for external entities that released this data without authorization by searching the tracking system database using "credit card" and "date-of-birth" characteristics in order to identify all external entities with which the data holder 100 shared this data for account holders living in Arizona (in addition to address data and e-mail address data for those same people). By continuing to focus searches in this way, the representative identifies one external entity (or a few external entities) as candidate source(s) of the unauthorized release. Interviews with, or other investigative actions toward, personnel associated with the candidate source(s) of the unauthorized release [e.g., in the course of a private investigation sponsored by the data holder, in conjunction with a discovery request in association with a civil action by the data holder (e.g., for breach of a confidentiality clause in a data sharing contract), or in the course of a state-sponsored criminal investigation of a candidate source (e.g., for violating a statutory law protecting a privacy interest of members living in Arizona)] may further implicate (or exonerate) the candidate source(s) of the unauthorized release.

Even if all external entities release data only after receiving appropriate authorization (i.e., there are no unauthorized releases by external entities of sensitive data), embodiments are useful for purposes of information security management. That is, embodiments also allow a data holder to quantify and characterize data that is shared with external entities.

Software/hardware in some embodiments may range in size from large [e.g., those in which numerous linked multi-server systems are running WEBSPHERE® (International Business Machines Corporation, Armonk, N.Y.) software and are further linked to multiple workstations running MICROSOFT® ACCESS® (Microsoft Corporation, Redmond, Wash.) software for the storage and analyses of data characteristics entered by many users into online data inventory forms at those workstations] to small [e.g., those composed of a single personal computer running widely available spreadsheet software (e.g., MICROSOFT® EXCEL®) for the storage and analysis of data characteristics entered by one or few users at that single personal computer]. Software/hardware embodiments are assembled using materials and procedures known to those of skill in light of the present disclosure.

Following long-standing patent law convention, the terms "a" and "an" mean "one or more" when used in this application, including the claims. Even though embodiments have been described with a certain degree of particularity, it is evident that many alternatives, modifications, and variations will be apparent to those skilled in the art in light of the present disclosure. Accordingly, it is intended that all such alternatives, modifications, and variations which fall within the spirit and scope of the described embodiments be embraced by the defined claims.

We claim:

1. A system for tracking data, the system comprising:
a network;
a computer connected to the network and configured to receive data characteristics of the data, the data characteristics including at least sensitivity score for the data, wherein the sensitivity score is based at least in part upon the data's type, the computer further configured to receive entity characteristics of a plurality of external entities with which the data may be shared, the entity characteristics including at least a name for each of the plurality of external entities and a risk-of-release rating for each of the plurality of external entities, wherein the risk-of-release rating is based at least in part upon each of the plurality of external entities' business type and at least in part upon each of the plurality of external entities' past security performance and present security expertise;
the computer is further configured to accept entry of characteristics of data that was released without authorization by a data holder; and
a database connected to the computer, the database configured to store a record of the one or more data characteristics and the one or more entity characteristics, wherein the database is exclusively accessible by the data holder that is a business entity and the record is uniquely identifiable in the database by the data holder and provides information to the data holder regarding with which of the plurality of external entities the data is shared such that the information allows the data holder to identify one or more of the plurality of external entities as a source of a release of shared data by matching the entry of the characteristics of the data that was released with the risk-of-release ratings.

2. The system of claim 1, wherein the computer is further configured to search the database for the record from a plurality of records stored in the database using at least one of the data characteristics.

3. The system of claim 1, wherein the computer is further configured to search the database for the record from a plurality of records stored in database using at least one of the entity characteristics.

4. The system of claim 1, wherein the computer is further configured to update the record after at least one of the data characteristics has changed.

5. The system of claim 1, wherein the computer is further configured to recertify the record according to a predetermined schedule.

6. The system of claim 1, wherein the data characteristics include a point of contact for the data, the computer is further configured to:
update the record in the database when the point of contact changes; and
automatically notify a designated person of the change.

7. The system of claim 1, wherein the computer is further configured to receive the one or more data characteristics and the one or more entity characteristics over the Internet.

8. A computer-readable storage medium having computer-readable instructions stored thereon, the computer-readable instructions comprising:
a data tracking module; and
a user interface controllable by the data tracking module for allowing a user to:
input data characteristics, the data characteristics including at least a a sensitivity score for the data, wherein the sensitivity score is based at least in part upon the data's type;
input entity characteristics of a plurality of external entities with which the data may be shared, the entity characteristics including at least a name for each of the plurality of external entities and a risk-of-release rating for each of the plurality of external entities, wherein the risk-of-release rating is based at least in part upon each of the plurality of external entities' business type and at least in part upon each of the plurality of external entities' past security performance and present security expertise;
input characteristics of data that was released without authorization by a data holder; and
store a record of the data characteristics and the entity characteristics in a database, wherein the database is exclusively accessible by the data holder that is a business entity and the record is uniquely identifiable in the database by the data holder and provides information to the data holder regarding with which of the plurality of external entities the data is shared such that the information allows the data holder to identify one or more of the plurality of external entities as a source of a release of shared data by matching the entry of the characteristics of the data that was released with the risk-of-release ratings.

9. The computer-readable storage medium of claim 8, wherein the user interface is further controllable by the data tracking module to allow a user to search the database for the record from a plurality of records stored in the database using at least one of the data characteristics.

10. The computer-readable storage medium of claim 8, wherein the user interface is further controllable by the data tracking module to allow a user to search the database for the record from a plurality of records stored in database using at least one of the entity characteristics.

11. The computer-readable storage medium of claim 8, wherein the user interface is further controllable by the data tracking module to allow a user to update the record after at least one of the data characteristics has changed.

12. The computer-readable storage medium of claim 8, wherein the user interface is further controllable by the data tracking module to allow a user to recertify the record according to a predetermined schedule.

13. The computer-readable storage medium of claim 8, wherein the data characteristics include a point of contact for the data, the user interface further controllable by the data tracking module to allow a user to update the record in the database when the point of contact changes, the data tracking module configured to notify a designated person of the change.

14. A method of tracking data, the method comprising:
receiving data characteristics of the data, the data characteristics including at least a sensitivity score for the data, wherein the sensitivity score is based at least in part upon the data's type;
receiving entity characteristics of a plurality of external entities with which the data may be shared, the entity characteristics including at least a name for each of the plurality of external entities and a risk-of-release rating for each of the plurality of external entities, wherein the risk-of-release rating is based at least in part upon each of the plurality of external entities' business type and at least in part upon each of the plurality of external entities' past security performance and present security expertise;
receiving characteristics of data that was released without authorization by a data holder; and
storing a record of the data characteristics and the entity characteristics in a database, wherein the database is exclusively accessible by the data holder that is a business entity and the record is uniquely identifiable in the database by the data holder and provides information to the data holder regarding with which of the plurality of external entities the data is shared such that the information allows the data holder to identify one or more of the plurality of external entities as a source of a release of shared data by matching the entry of the characteristics of the data that was released with the risk-of-release ratings.

15. The method of claim 14, further comprising searching the database for the record from a plurality of records stored in the database using at least one of the data characteristics.

16. The method of claim 14, further comprising searching the database for the record from a plurality of records stored in database using at least one of the entity characteristics.

17. The method of claim 14, further comprising updating the record after at least one of the data characteristics has changed.

18. The method of claim 14, further comprising recertifying the record according to a predetermined schedule.

19. The method of claim 14, wherein the data characteristics include a point of contact for the data, further comprising:
updating the record in the database when the point of contact changes; and
automatically notifying a designated person of the change.

20. The method of claim 14, wherein the data characteristics and the entity characteristics are received over the Internet.

* * * * *